United States Patent
Addin

[15] 3,645,041
[45] Feb. 29, 1972

[54] METHOD OF GROWING PEAR TREES FROM SLIPS

[72] Inventor: Leo Addin, P.O. Box 53, Los Molinos, Calif. 96055

[22] Filed: Jan. 26, 1970

[21] Appl. No.: 5,603

[52] U.S. Cl. ................................47/58, 424/177
[51] Int. Cl. ........................................A01m 5/00
[58] Field of Search ........................47/5.5–7, 58; 424/177

[56] References Cited

OTHER PUBLICATIONS

Handbook on Propagation, Bklyn Bot. Garden, 1957, pp. 6–15
"Transplanting Trees" Scientific American, Dec. 10, 1887, page 389 relied on Primary Examiner—Robert E. Bagwill
Attorney—C. Michael Zimmermann

[57] ABSTRACT

Healthy, vigorous pear trees are produced from pear tree slips by treating the bottom section of the slips with an aqueous slurry of proteins and trace quantities of amino acids and then planting the slips directly into a plant growth medium. The resulting trees are usually resistant to pear tree diseases, sustain growth rates which compare favorably with grafted trees, and have significantly lower mortality rates in advanced stages of growth.

10 Claims, 2 Drawing Figures

Patented Feb. 29, 1972

3,645,041

INVENTOR.
Leo Addin
BY
ATTORNEY

METHOD OF GROWING PEAR TREES FROM SLIPS

BACKGROUND OF THE INVENTION

This invention relates generally to nursery methods for raising young transplantable fruit trees and, more particularly, to a commercially practical method for producing viable fruit trees from slips.

During the last decade, the demand for young fruit trees especially pear trees, has steadily increased. At the same time, the production of fruits such as pears has actually seen a significant decline. An important reason for these changes is the increasing number of fruit producing trees which are killed by disease. With respect to pear trees, the diseases commonly known as pear decline and leaf curl are causing a 10 percent annual tree loss. Leaf curl and other diseases also stunt and retard growth and otherwise weaken pear trees. The weakened trees are then prime candidates for pest infestation, such as borers and the like, which results in further tree destruction.

Millions of dollars have been spent on the study of pear tree diseases and pests, and research on methods for combatting them. Much has been learned. For example, it is certain that many of the diseases are basically caused by viruses, and that insects and pests play an important role in the transmission of such diseases, as well as being damaging to the trees themselves. However, in spite of the massive expenditure of funds, the basic mechanisms and biochemistry of diseases such as decline and leaf curl, and the role of pests in such diseases, have thus far not been elucidated.

As mentioned previously, the average California pear production has actually decreased during the past decade. This has been so in spite of extensive replanting of pear trees to replace the tree losses caused by disease and pests. The acreage of California pear orchards has actually seen an increase of about 2,000 acres since 1966. The important consideration is that the tree which is destroyed is often adult and fully productive, whereas the replacement tree requires several seasons of growth before it reaches an age where it produces harvests of profitable quantities. One might say that the process of growing trees, as many other growth processes in the life sciences, is characterized by an unusually large time constant which has pronounced effects upon the orchard and nursery economics, experimentation, and predictability of the performance of specimens of different kinds and grown under different conditions.

To the nursery operator, and the orchard owner as well, the most important parameter is the tree mortality rate during advanced growth stages, i.e., above about 3 years of age. In later stages, i.e., above about 15 years of age, the mortality rate becomes less critical, since by that time the healthy tree his had a sufficient number of productive years to have yielded a fair return on the investment. A second consideration is, of course, the growth rate itself, since this parameter determines the integrated yield of the tree during its lifetime.

It is these qualities, i.e., low mortality in advanced growth stages and predictably good growth rates, which presently available pear trees are most markedly lacking. This is in significant measure due to the susceptibility of such trees to diseases and pests.

THE PRIOR ART

The current practice of producing pear trees for transplantation generally involves the grafting of pear tree branches from a desired pear producing species to a root stock of another variety which is noted for its hardiness and growth-promoting quality. This method seeks to produce a tree with an optimum combination of a strong root structure and the growth potential which goes with it, and a fruit-bearing upper portion which furnishes the desired variety of pear with the requisite taste, quality and quantity. This method of producing fruit trees by grafting shoots to different root stocks is used to propagate most fruit trees. In the case of pear trees, this method has been used almost exclusively since the beginnings of domestic commercial pear production in orchards.

However, trees produced in this manner suffer from the high incidence of mortality and growth retardation due to leaf curl and pear decline in the advanced growth stages referred to previously. Moreover, grafted trees are generally quite weak in the earlier growth stages and then are highly susceptible to diseases and pests at such a time. It is well known that the graft union, i.e., the joint between the root stock and the fruit-bearing upper portion of the tree, contains significantly higher concentrations of fertilizer and insecticide residues and derivatives. It has not been established if these residues are responsible for the high incidence of disease and pest attack. However, surveys of different kinds of trees grown under different conditions confirm that grafted trees do succumb in late growth stages and in early productive seasons with a relatively high frequency. The high mortality has, of course, been the general experience of growers whose adult stock is composed chiefly of grafted trees.

While pear trees are not commercially produced from slips, it is well known to horticulturists and botanists that the branches of many plants can develop roots when planted in the soil after cutting. It is also well known, although, that is generally not the case with trees. That is, tree slips planted in the soil will usually not grow, and if they grow at all, such growth is considerably slower and less vigorous compared to trees grown from seeds or grafted slips. This is apparently due to the weaker, less well-developed root structure. It is believed that in the early stages after planting, when the roots are only just developing, irreversible changes take place in the slip itself which permanently impair the development of the tree.

Accordingly, it is an important object of this invention to provide a healthy transplantable tree which is not weakened by the presence of a graft union.

In addition, an object of this invention is to provide a method by which pear trees may be raised from slips at a rate of growth and development comparable or better than pear trees produced by grafting or from seeds.

An additional object of this invention is to provide a transplantable pear tree which is not susceptible to pests and to diseases such as pear decline, leaf curl, etc., and more generally, which has a reduced mortality rate in the advanced stages of growth, i.e., between the time of thinning the slips and the bearing of fruit.

SUMMARY OF THE INVENTION

The above objects and others can be achieved by planting and raising pear trees in the following manner: During the dormant season, e.g., in the fall, after the fruit has been harvested, slips are cut from pear trees. After cutting, the slips are dehydrated somewhat prior to planting, then their butt ends are dipped into an aqueous, relatively viscous slurry which is prepared by mixing proteins and small quantities of amino acids with an appropriate amount of water or liquid whey, as described in detail further below. The slips soak up some of the slurry and their bottom ends are coated with a layer of the proteins and amino acid. Thereafter, the slips are planted in the soil. The planted slips are preferably subjected to an initial critical scrutiny to immediately eliminate poorly growing or seemingly afflicted specimens. Thereafter, the trees are desirably fertilized annually with the same protein-amino acid fertilizer. The transplantation of the slips into orchards may take place as early as one year after initial planting, during which transplantation, care should be exercised to plant the slips in the same compass orientation as they were previously planted in order to maintain optimum growth rates. Generally, trees raised in this manner bear fruit in their sixth season after initial planting.

The advantages of this method relate primarily to the economics of raising trees, in that it is possible to raise the pear trees directly from slips without compromising the growth rate and productivity of the ultimate trees, and at the same time, largely eliminating large-scale losses normally occurring after the second year of growth.

These and other advantages, objects and features of this invention will become more apparent to those skilled in the art upon a consideration of the following description, as well as the drawing, which is intended to illustrate a specific preferred form of the invention in greater detail.

DESCRIPTION OF THE DRAWINGS

With reference to the accompanying drawing.

DETAILED DESCRIPTION OF THE INVENTION

The initial step of the present method comprises the cutting of the pear slip. By the term slip is meant a shoot which grew from a branch or the trunk of the parent tree preferably during the previous spring. The slips which originated in the previous season are readily identified by the greener color of the bark. This is usually the kind of shoot which is eliminated by pruning, since from the point of view of the fruit grower, its growth competes with the development of fruit. It is good practice to be very selective in the cutting of shoots, both in selecting healthy trees, as well as closely inspecting the slips themselves. The kind of shoots which are preferred are those which are left on fruit-bearing trees which have been pruned the previous spring, preferably those growing from a major branch near the trunk of the tree, and not too far from the tree's periphery. However, the dominant consideration is the appearance of the slip. An undamaged bark structure, copious budding and the dimensions given below are the important qualities, it being understood that such slips can be found on any part of the tree. At its larger end, the slip should be about one-eighth to one-half inch thick, preferably between one-eighth and three-eighth inch thick. For best results, the slip is preferably over 22 inches in length.

While the best time for cutting the slip is in autumn during the period when the tree loses its leaves, they can be cut anytime during the tree's dormant season. The cut is generally an oblique cut at about 45°–60° to the axis of the shoot.

Figure 1:
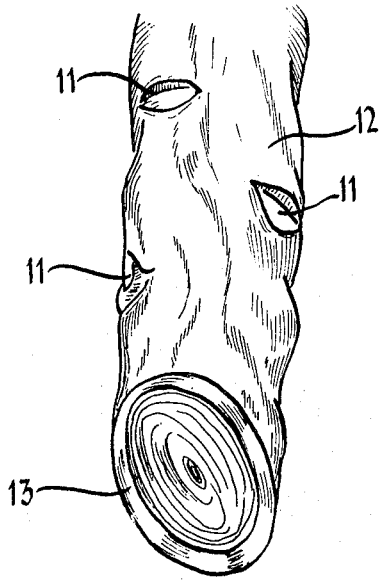
FIG. 1 shows the preferred manner of cutting and preparing the bottom section of the slips, by severing the slip from the tree with an oblique cut, as well as providing shallow, discontinuous notches near the bottom of the slip, as shown.

The root structure develops from the cut portions of the tree; accordingly, it is preferred to incise additional notches into the slip as shown in FIG. 1. These notches are cut into the bark 12 between the cut end 13, about 2 inches away from the end in a staggered relation so as to leave a sap path through the bark. Preferably, two to four notches between one-eighth and one-fourth inch deep are cut on each slip.

An equally important step in the method of the invention is the dipping of the bottom section, e.g., about 2 inches from the cut end, into a water or whey slurry of proteins and amino acids before planting. The preferred growth stimulant, its detailed composition and properties, are described in my U.S. Pat. No. 3,431,676, issued on Mar. 11, 1969, which is intended to be incorporated herein by reference. The growth stimulant described therein generally comprises 20–40 percent of one or more proteins such as the vegetable or animal proteins including the albumins, globulins, histones, protamines and glycoproteins, and about 0.02–0.04 prevent of amino acids, generally those obtained from protein hydrolysis such as glycine, alanine, valine, leucine, serine, and others, in a liquid vehicle of water or, preferably, whey. While in the patent it is suggested that soap be added, this is not necessary for the slurry of the instant invention. For present purposes, the aqueous slurry may also be more concentrated, i.e., containing only about one-half to one-fourth of the quantity of liquid called for in the patent for purposes of irrigating the soil around a grown plant. The slurry is therefore more concentrated and viscous, and forms a thicker continuous coating over the bottom section of the slip. The total quantity of protein and amino acid used is about 1 pound per 100 slips.

The primary purpose of the step of dipping the slip into the growth stimulant described is, of course, to provide a copious source of concentrated fertilizer immediately adjacent to the slip after planting. The value of said fertilizer in combatting diseases in grown trees, while being otherwise devoid of harmful or poisonous substances, has been demonstrated previously, and is discussed in the patent referred to above. In the case of adult trees, the upper limit of the quantity of fertilizer applied is less critical. However, in the case of slips, it has not been firmly established that an upper limit does not exist. Accordingly, while this fertilizer could conceivably be placed into the soil dipping the slip into a slurry has the advantage of automatically metering a proper quantity of fertilizing substance per slip. In addition, the initial uptake of fertilizer, as well as subsequent feeding, is superior as a result of dipping.

The initial fertilizer uptake can be further improved by the following procedure. After cutting the slips, they are stored for a period of from about 1 to 2 weeks under moderately dehydrating conditions of temperature and dryness. This may be accomplished by storing the slips in and under straw or hay in a sheltered location. As the slips become somewhat dehydrated, their normally smooth bark assumes a slightly uneven or wrinkled form. The slips are then dipped into the above described slurry in this partially dehydrated condition, which promotes drawing the water dissolved proteins and amino acids up into the slip stem.

Providing the protein and amino acid in this initial step is essential. In experiments with nearly 5,000 slips from various sources planted successively at different times without the slurry dipping, I have found that none of these grew satisfactorily; in fact, the vast majority never came to life or showed any signs of rooting.

The slips treated with the proteinaceous growth stimulant are then planted in the soil. The soil which I use in my beds is relatively loose and light, with a significant fraction of granular sand mixed with humus. The slips may be planted in fall or winter, and the soil is maintained in a fairly moist condition. However, at all times, care should be exercised not to irrigate the slip from the top so as not to wash the fertilizer coating into the soil. Early in the year, before the onset of spring, irrigation water is administered more frequently.

Slips planted in accordance with the method of the invention not only develop roots but also are sufficiently healthy in the early stages of their growth to resist attack by pest, such as by the shot-hole borer and the like, which generally attack weak trees. Besides such pests being damaging themselves to the trees, it is believed as mentioned above that they may very well be a carrier of viruses which cause pear decline and leaf curl. It will be appreciated, though, that some slips planted by the method of the invention will be weak and shown signs of infestation. I recommend, of course, the elimination of all slips which are observed to be infested. However, experience has shown that some of such slips with nevertheless take root and grow if left undisturbed. Heavily infested slips, though, usually succumb or do not come to life at all. Although I prefer to eliminate infested slips from the beds during winter, primarily to weed out those slips which have a higher probability of carrying the viruses referred to previously, it should be noted that my slips are grown in the open and are therefore exposed to pests from adjacent orchards during the swarming season. Yet, the slips are not further attacked, which may be due to a repelling influence of the protein-amino acid solution and which may account in part for the undiminished vigor and growth of the slips.

Figure 2:
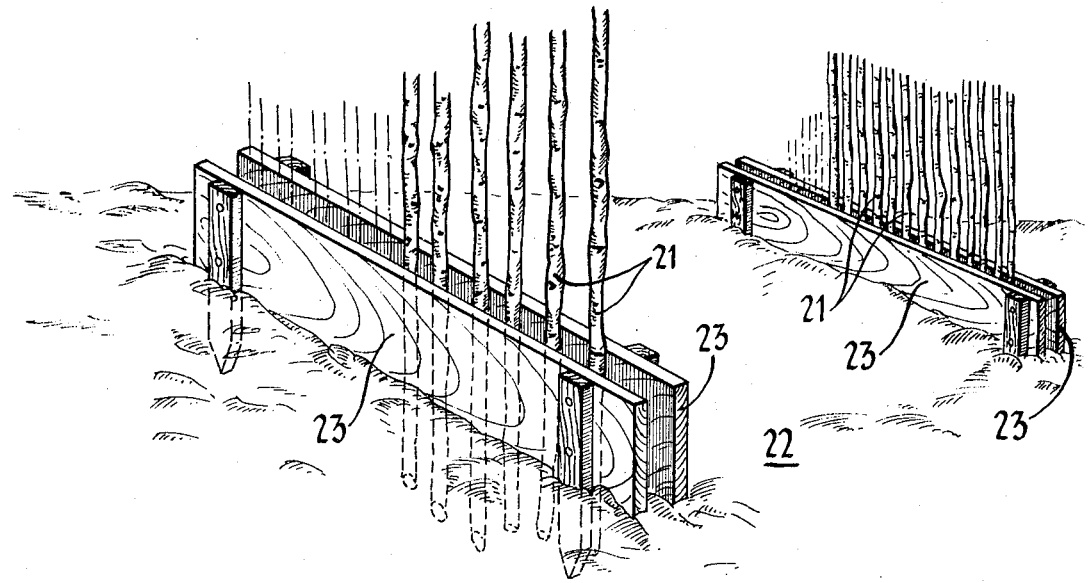
FIG. 2 shows the preferred arrangement of the soil bed for the initial planting and growing of the slips.

The preferred arrangement of the bed for planting the treated slips is shown in FIG. 2. With reference to this Figure, slip 21 is shown embedded in the soil 22 to a depth of about 2 inches. Parallel lathes or boards 23 and 24 are disposed edgewise upon the surface of soil 22 immediately adjacent to opposite sides of the slips. The lathes are about 2 to 3 inches in height, and provide support to the slips, as well as preventing sunlight and water from directly striking the lower slip section. The slips are planted close together, i.e., only ½ to 1 inch apart.

For best results, the planted slips are again treated in the spring of the year following their planting, with the protein-amino acid solution discussed above. That is, the solution is applied to the ground adjacent to the plant and allowed to soak into the soil. Additional water can be applied to the ground to aid in good penetration of the solution into the soil. About 1 pound of the solution should be used for each 1 hundred trees.

After one or two years of growth, the slips are transplanted into an orchard. Such transplanting should be done during the dormant season, i.e., late autumn or winter. The trees are again treated with the protein-amino acid solution at the time they are transplanted. For best results, one-half of the solution for each tree is placed in the bottom of the hole made in the transplant bed for the tree, and one-half is applied to the top of the soil around the tree after the tree has been planted. Water can then be used to assure penetration into the ground of the solution placed on top of the soil.

During the transplanting, care is taken to assure that when the trees are transplanted they are oriented in the same compass direction of the plant is maintained the same at all times, i.e., when the tree grown from the slip is transplanted into an orchard it should still have the same orientation with respect to the compass as the slip had on the tree of which the slip was a part. For convenience, it is desirable to mark the compass direction on each slip at the time it is cut from its parent tree to facilitate maintaining the orientation constant. In the succeeding spring, and each year thereafter, the trees are again fertilized with the protein-amino acid solution. Generally, trees raised in accordance with the invention bear commercially acceptable fruit in the sixth growing season after initial planting.

EXAMPLE 1

During experimentation with the method of the invention, 17 slips dipped in a solution of a mixture of dry milk and amino-acid in the proportions set forth above were planted directly in an orchard along with 300 2-year-old root stock trees which were commercially bought. The 17 trees were appropriately marked for identification and then interspersed within the orchard among the other 300 trees to assure that on the average such trees would be subjected to the same growing conditions as the 300. All of the trees were planted in the winter of 1962-1963 and have since that time been given the same watering and fertilizer treatment. Of the original 300 root stock trees, there are no survivors. However, each of the 17 slips matured into a fruit-bearing tree after only 6 years of growth.

What is claimed is:

1. A method of raising pear trees from pear tree slips, comprising the steps of cutting said slips from fruit-producing pear trees during the dormant period of the tree's annual life cycle; dipping the cut bottom portion of said slips into a thick, aqueous slurry of protein mixed with trace quantities of amino acid to thereby coat the bottom portion of said slip with a layer of protein and amino acid planting said slips in soil to allow the development of a root structure capable of supporting the life of said slip; and thereafter transplanting said slip.

2. The method of raising pear trees according to claim 1, further defined in that said slips are cut from new shoots developed by said pear tree in the previous growth period of said tree's annual life cycle, said slips having a length of about 22 inches or more and a thickness of about one-eighth to one-half inches at the bottom near the cut end of said slip.

3. The method of raising pear trees according to claim 1, further defined in that, after planting in the soil, the slips are annually fertilized with an aqueous solution of protein and trace amounts of amino acids at a rate of about one-half to 2 lbs. of protein per 100 slips per year, said aqueous solution being applied to said slips at a point in time which is near the start of the growing period of said slips.

4. the method of raising pear trees according to claim 3, further defined in that said slips are transplanted after 1 or 2 years of growth to have the same compass orientation after transplanting as before.

5. The method of raising pear trees according to claim 4 wherein at the time said slips are transplanted they are treated with an aqueous solution of protein and trace amounts of amino acids.

6. The method of raising pear trees from slips according to claim 2, further defined in that a plurality of discrete notches are cut into the bottom portion of each of said slips near the cut and thereof in order to enhance the development of roots.

7. The method of raising pear trees as defined in claim 2, further defined in that said slips are intensively inspected and all slips showing signs of infestation by pests are immediately discarded.

8. The method of claim 1, further defined in that, after said slips are cut from the parent tree, said slips are stored under conditions of moderate temperature and dryness for a period of about 1-2 weeks in order to partially dehydrate said slips prior to dipping said ships in said slurry.

9. The method of claim 2, further defined in that said slips are planted in closely spaced relation in beds of clean, loose soil, between parallel paths disposed along the surface of said beds.

10. The method of claim 1 further including after cutting said slips the step of partially dehydrating the same prior to dipping of said bottom portions into said slurry to promote uptake by said slips of said slurry.

* * * * *